Inventor
JOHN F. CAMPBELL

July 5, 1955   J. F. CAMPBELL   2,712,208
METHOD AND APPARATUS FOR WRAPPING
Filed Oct. 22, 1949   7 Sheets-Sheet 3
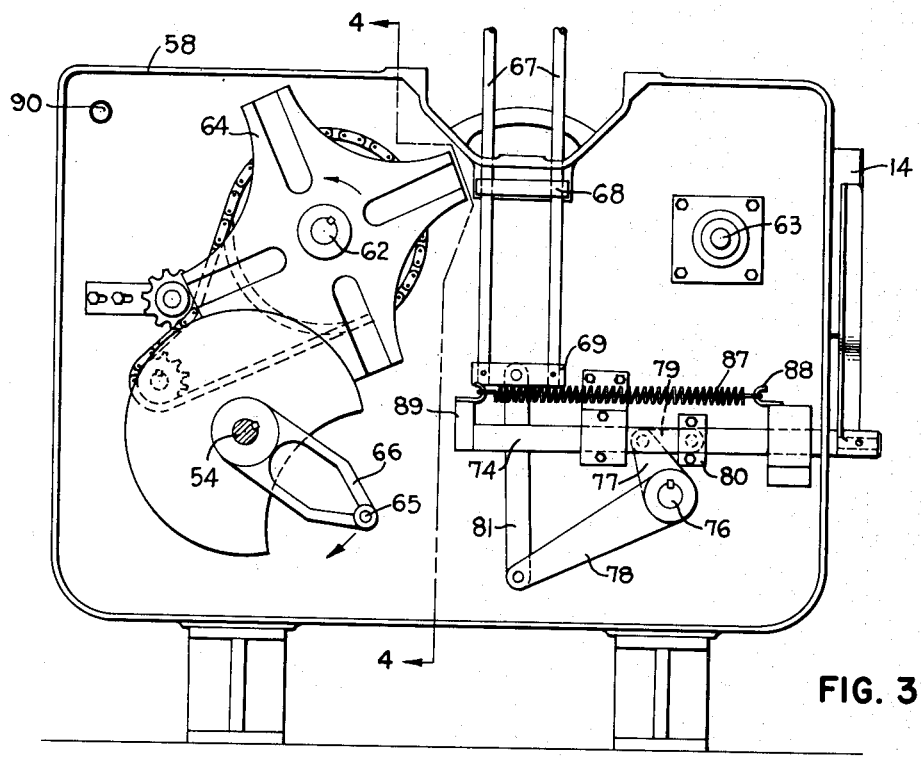
FIG. 3
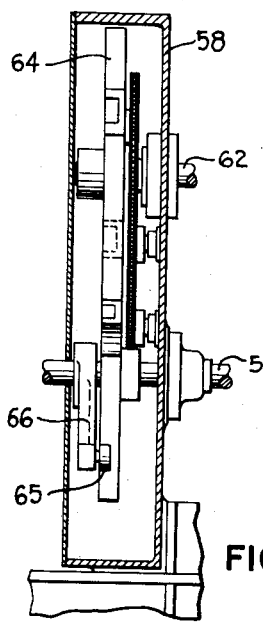
FIG. 4
FIG. 11   FIG. 12
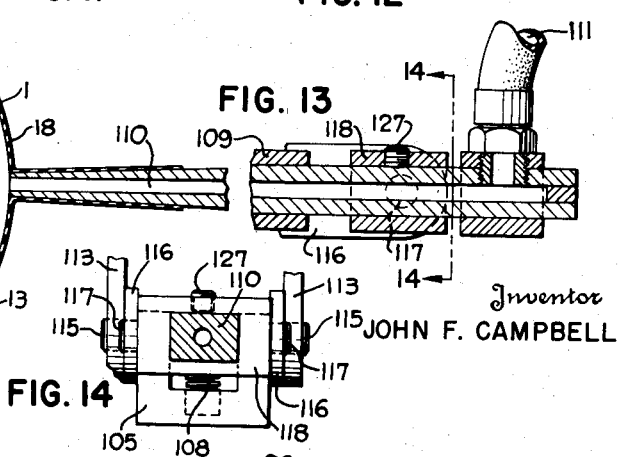
FIG. 13
FIG. 14
Inventor
JOHN F. CAMPBELL
By P. L. Miller
ATTORNEY

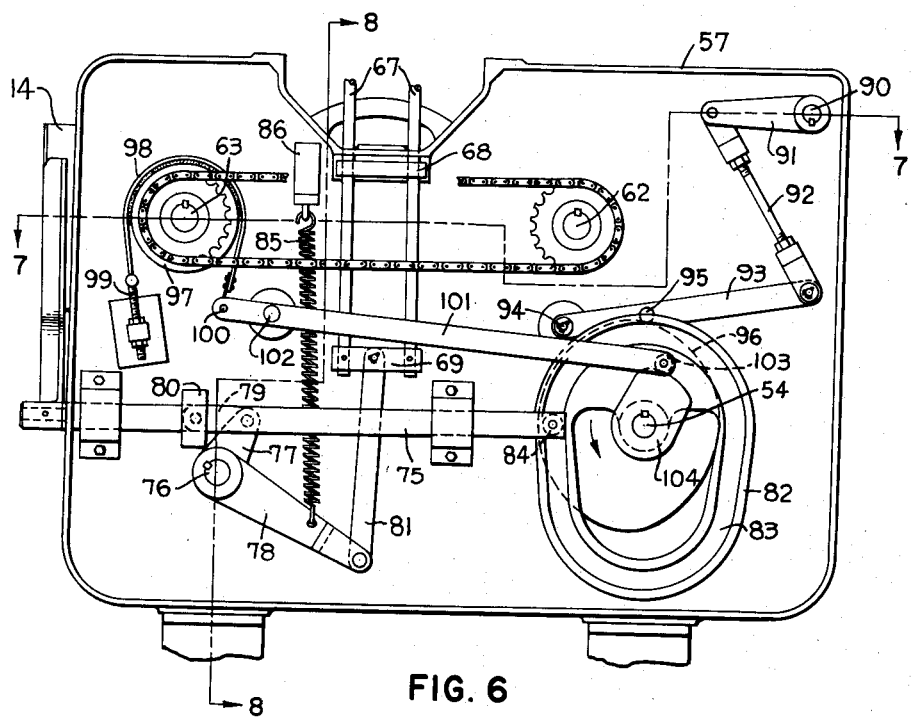
FIG. 6
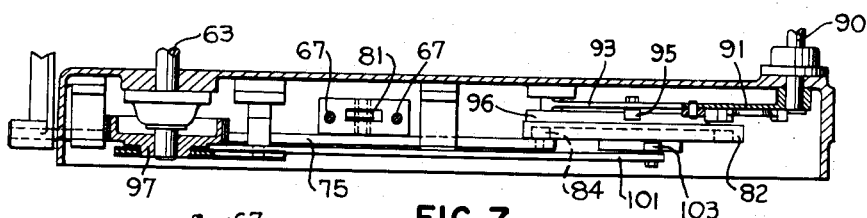
FIG. 7
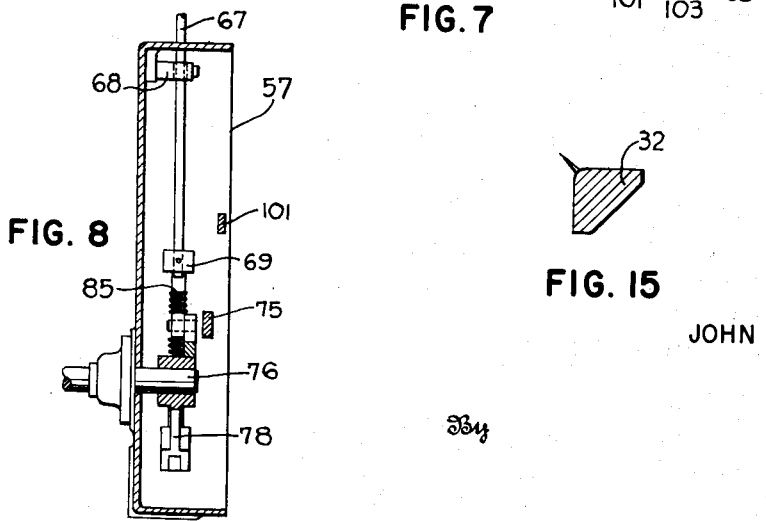
FIG. 8
FIG. 15
Inventor
JOHN F. CAMPBELL
By
R. L. Miller
ATTORNEY July 5, 1955 — J. F. CAMPBELL — 2,712,208
METHOD AND APPARATUS FOR WRAPPING
Filed Oct. 22, 1949 — 7 Sheets-Sheet 6

Inventor
JOHN F. CAMPBELL
By R. L. Miller
ATTORNEY

Inventor
JOHN F. CAMPBELL

By
R. L. Miller
ATTORNEY

United States Patent Office 2,712,208
Patented July 5, 1955

2,712,208

METHOD AND APPARATUS FOR WRAPPING

John F. Campbell, Cuyahoga Falls, Ohio, assignor, by mesne assignments, to The Goodyear Tire & Rubber Company, a corporation of Ohio Application October 22, 1949, Serial No. 123,002

13 Claims. (Cl. 53—9)

The present invention relates to a wrapping machine and a primary object of this invention is to provide a machine for wrapping articles of various kinds but particularly articles of food.

More particularly, this invention has for its object the provision of means for evacuating air from the wrapper around the article so as to prevent spoilage of food wrapped therein and to cause the wrapper to snugly embrace the article wrapped. The evacuation of the air from the wrapper is carried on simultaneously with the wrapping operation, the final sealing of the wrapper taking place upon the withdrawal of the evacuating means from the wrapper, all of which will be more fully explained as the description proceeds.

Another object of this invention is to provide a wrapping machine which will wrap articles preferably in a thermosealing wrapping material and then trim the wrapper to eliminate excess portions thereof. Essentially, this comprises a heated knife or wire which severs the material closely adjacent the wrapped article.

Another object of this invention is to provide a wrapping machine for wrapping a series of articles successively between two layers of wrapping material, sealing the wrapping material about the article and thereafter severing each article from the web formed by the overlapping layers of wrapping material.

Another object of this invention is to provide a method and means for wrapping articles between two opposed layers of wrapping material by means of highly compressible material brought against the wrapper in a direction toward the article and from opposite sides thereof and to provide in at least a portion of the highly compressible material, herein shown as sponge rubber or the like, a recess of the general shape of the article to insure a more or less uniform pressure of the highly yieldable material against the article being wrapped, especially where the articles have a substantial dimension in the direction in which the yielding material is brought against the wrapper and article.

Another object of this invention is to provide means for evacuating the air from between the sheets of wrapping material as the article is being wrapped, this means comprising a hollow member insertable automatically between the layers of wrapping material during the wrapping operation and, as the wrapping material is pressed about the article, withdrawing the hollow member progressively from between the layers of wrapping material while the pressing elements are against the wrapping material whereby the wrapping material is sealed about the opening formed by the hollow member as the hollow member is withdrawn, thereby preventing the re-entry of air into the package.

Other objects of this invention are to provide novel means for actuating the feeding means for the wrapping material, means for progressively advancing the article to a wrapping position and means for then advancing the article to a trimming position, and to provide mechanisms for controlling and synchronizing the advancing mechanisms utilized in the machine. Another object is to provide a novel method of wrapping which includes the steps of wrapping an article between thermoplastic sheets of material and simultaneously heat sealing the layers together while evacuating the air from between the layers, whereby the wrapping material will lie snugly against the article.

A still further object is to provide novel means for holding the web of wrapping material away from the article support while the wrapped article is being trimmed.

Other objects of this invention will become apparent as the description of the invention proceeds, the novel features thereof being set forth in the specification and in the claims thereunto appended.

In the drawings:

Fig. 3 is a section taken along the line 3—3 of Fig. 2 with the cover plate removed;

Fig. 4 is a section taken along the line 4—4 of Fig. 3;

Fig. 6 is a section taken along the line 6—6 of Fig. 2;

Fig. 7 is a section taken substantially along the line 7—7 of Fig. 6;

Fig. 8 is a section taken substantially along the line 8—8 of Fig. 6;

Figure 2:
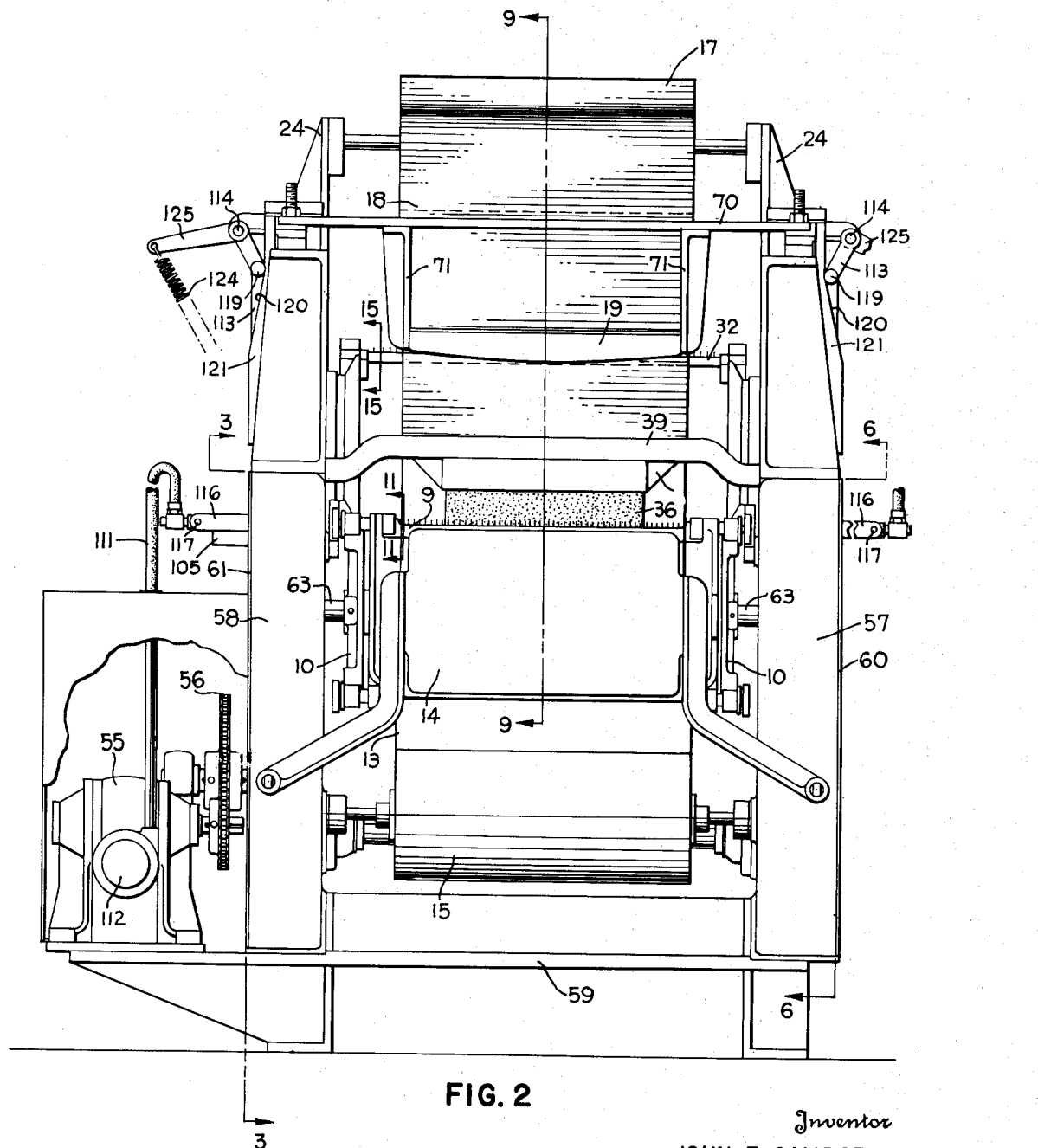
Fig. 2 is an end elevation looking from the right in Fig. 1.
Figures 9, 10:
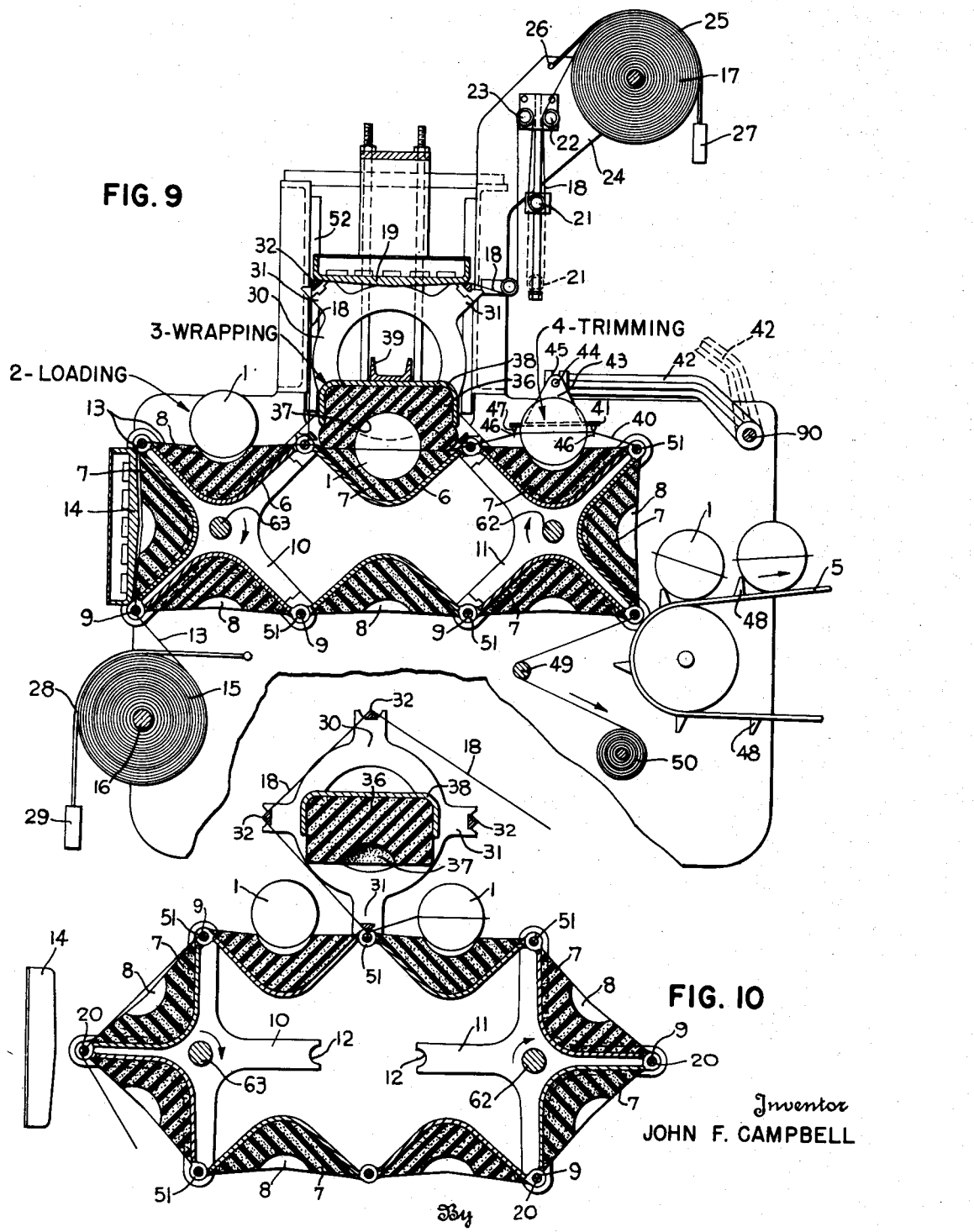
Fig. 9 is a section taken substantially along the line 9—9 of Fig. 2.
Figure 16:
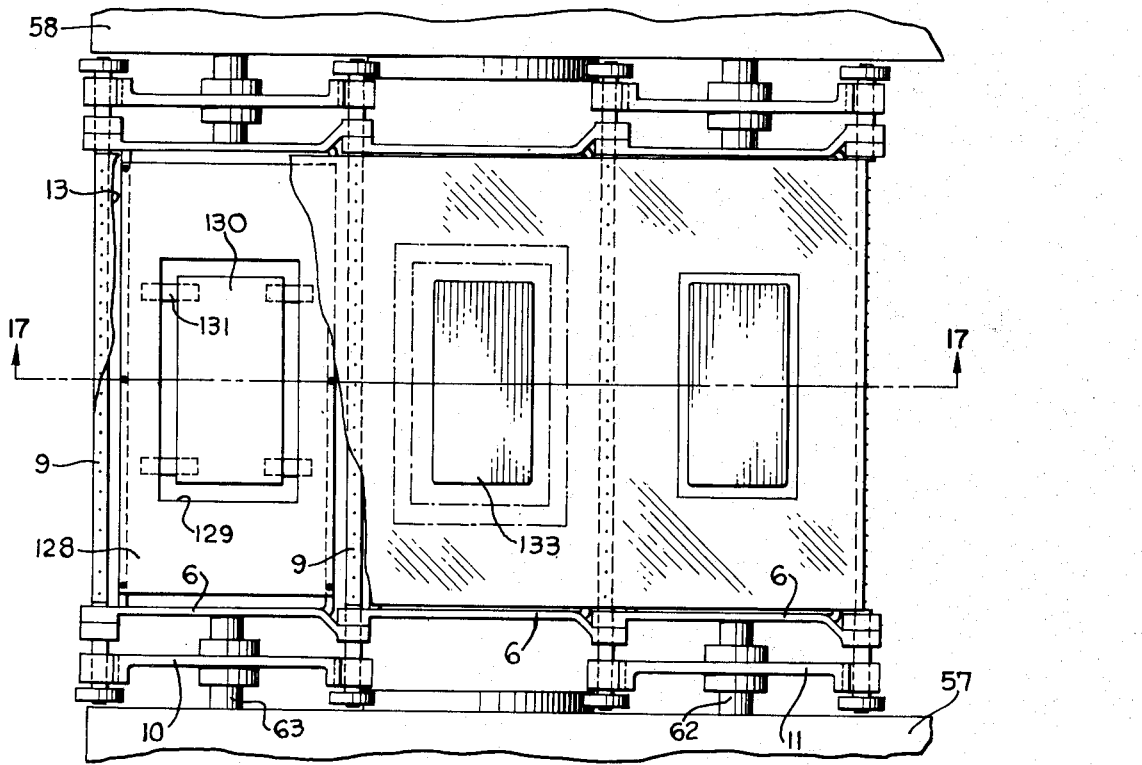
Figure 17:
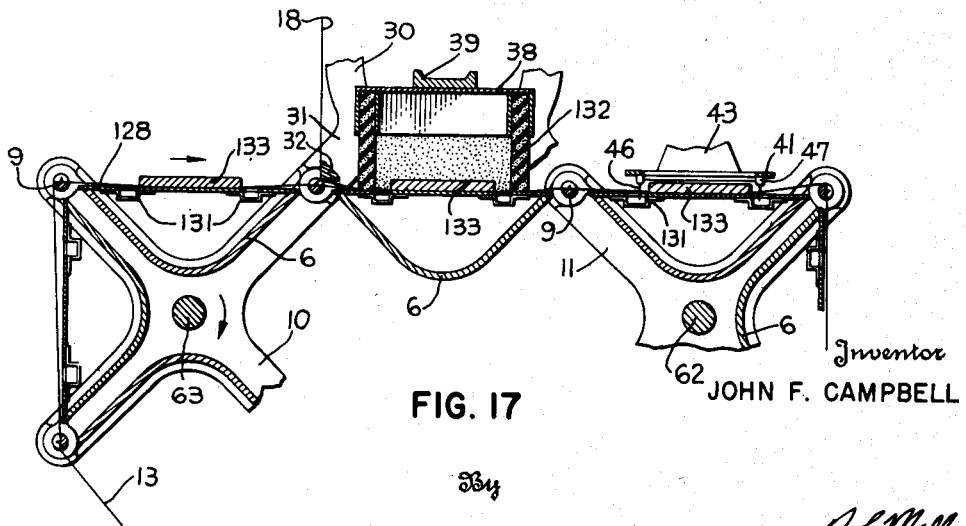

Fig. 10, which is somewhat schematical in character, shows an intermediate position of the parts shown in Fig. 9;

Fig. 11 is a cross section taken substantially along the line 11—11 of Fig. 2;

Fig. 12 is a detail of the rod shown in Fig. 11 looking from the right in that figure;

Fig. 13 is an enlarged cross-sectional view, partly broken away, of the nozzle;

Fig. 14 is a cross section taken substantially along the line 14—14 of Fig. 13;

Fig. 15 is a cross section taken substantially along the line 15—15 of Fig. 2;

Fig. 16 is a plan view of a modified arrangement for packaging flat articles such as sliced bacon; and Fig. 17 is a section taken along the line 17—17 of Fig. 16.

The basic concept of the invention can perhaps be best understood by the reference to Figs. 9 and 10. The article 1 to be wrapped is shown at three successive positions, the first of which is designated as the loading position 2, the second as the wrapping position 3 and the third as the trimming position 4. After the article has been trimmed, it is discharged onto a conveyor 5 and carried away.

In order to advance the article through successive positions, there is provided a series of bucket conveyors 6, each of which has a replaceable filler 7 of highly compressible material, preferably of the nature of sponge rubber, and this material is recessed on its upper side 8 substantially to the size and shape, but somewhat smaller than, the article to be wrapped, as illustrated at the loading position in Fig. 9. The type of article to be wrapped will determine the shape of the recess 8 and in each case it is preferable that the size of the recess be slightly smaller in all dimensions that the size of the corresponding dimensions of the article to be wrapped to insure that during the wrapping operation a relatively uniform pressure will be exerted against the wrapping material for the purposes which will be apparent hereinafter.

All of the bucket conveyors are connected together by suitable pivot pins 9, thus forming in effect an endless chain. The endless chain is supported and moved by two star wheels 10 and 11, each having four arms at 90° from each other and the ends of each of these arms are provided with an open-sided recess 12 (Fig. 10) to receive the pins 9. If these star wheels are rotated in the direction of the arrows shown in Figs. 9 and 10, the buckets are advanced through the successive positions referred to above. The star wheels 10 and 11 are intermittently rotated so that the buckets come to rest in the position shown in Fig. 9 and are thereafter advanced to the next successive position, etc. The mechanism for intermittently rotating the star wheels will be described later.

The article 1, which we have here shown as a sphere, is used merely for the purpose of illustration and is not intended to be limiting as other objects can be wrapped by a machine of this character. In Fig. 9, it will be noted that the article 1 at the loading position rests upon the heated stretchable wrapping material designated as 13 which is depressed by the weight of the article and the article in effect is supported by the edges of the recess 8. The wrapping material has previously been heated to permit stretching of the wrapping material into the recess and this is accomplished by means of a heating element 14 which has a substantially broad, smooth face engaging the wrapping material 13 over the desired area. The wrapping material is preferably a rubber hydrochloride film such as that known as Pliofilm and manufactured by The Goodyear Tire & Rubber Company of Akron, Ohio. Such material when heated can be readily stretched about an article to be wrapped. The heating also makes the material "tacky" so that it will adhere to a similarly heated sheet of material to provide an impervious seal, all of which is well understood in the art. The sheet 13 of wrapping material is fed from a roll 15 mounted on a rotatable shaft 16 in any desired manner.

Another roll 17 of wrapping material 18 is fed into a position opposite a heating element 19, similar to 14, whereby the wrapping material will also be heated in the desired area and can be stretched about the upper side of the article.

The wrapping material 13 is withdrawn from the roll 15 and advanced when the star wheels are rotated, the intermediate portions of the pins 9 being provided with small pointed projections 20 (Fig. 12) which bite into or penetrate the wrapping material to insure its advance at the desired rate and in synchronism with the movement of the buckets. Since the film is stretchable in the heated zone, the positive engagement of the projections with the film prevents this stretching and holds the film in proper position for application to the article at the wrapping position.

Provision must be made to insure proper tension in the wrapping material at all times and for this purpose there is provided a dancer roll 21 freely suspended in a loop of the wrapping material, as clearly illustrated in Fig. 9, the loop being formed between the rolls 22 and 23 rotatably mounted on the frame 24. The dancer roll 21 is preferably guided at its ends for free vertical movement but is held against endwise and lateral displacement. A flexible strap 25, attached to the frame 24 at 26, rests on the rolls of wrapping material 17, and a weight 27 or other tensioning device imparts the desired tension to the strap 25 to prevent overrunning of the roll when the star wheels come to rest and imparts enough tension to the wrapping material to insure that it remains in flat, extended position. There is also a similar strap 28 and a weight 29 for controlling the feeding of the wrapping material in roll 15.

Figure 5:
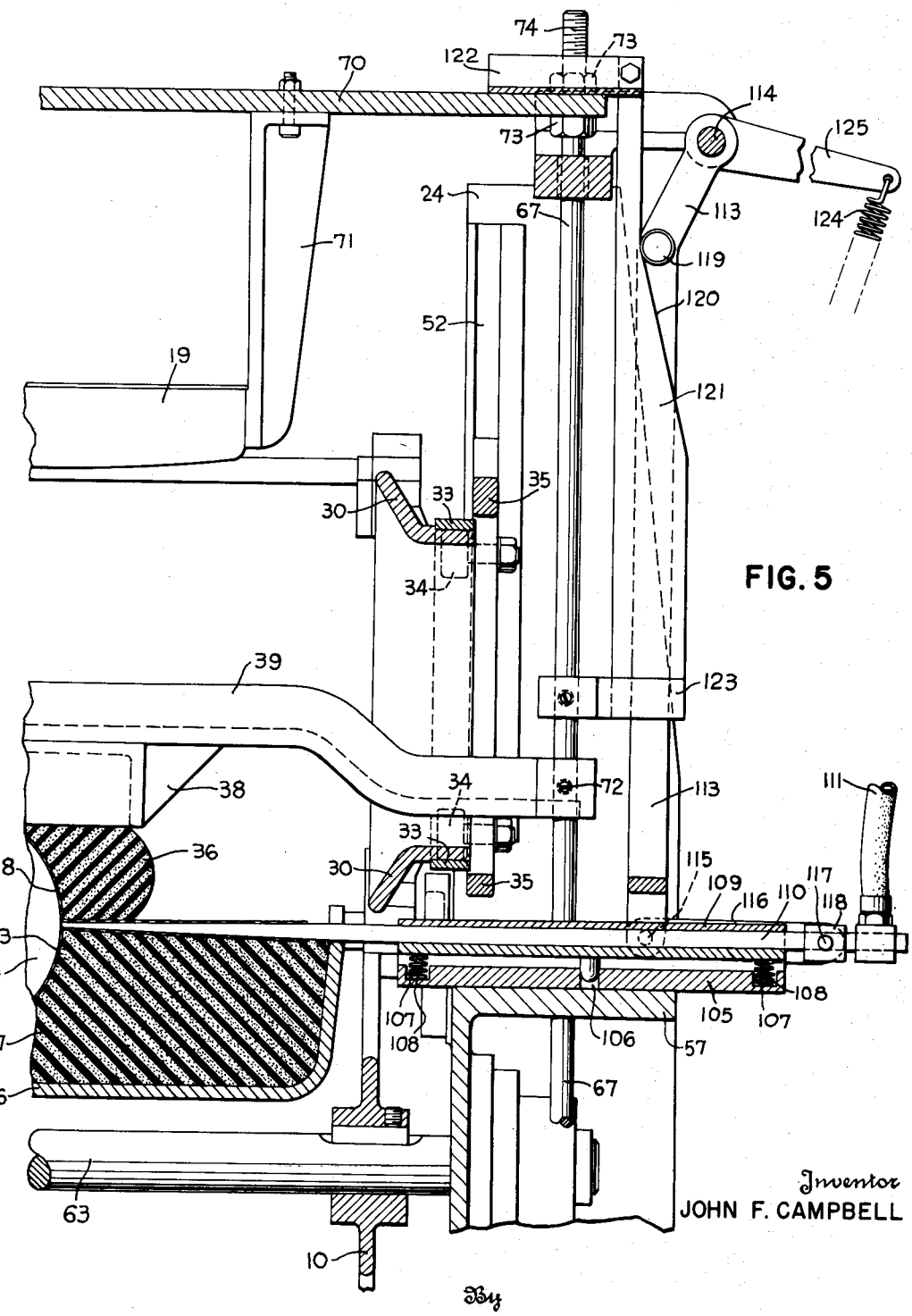
Fig. 5 is a section taken substantially along the line 5—5 of Fig. 1.

The feed for the upper layer of wrapping material is accomplished by means of two rotatable annular rings or star wheels 30 (Figs. 5 and 9), one on each side of the machine, each having the arms 31 provided with film supporting bars 32 which extend between respective arms on the rings 30 to support the wrapping material throughout its width. These film supporting bars 32 are preferably provided with suitable prongs such as those shown at 20 for the pivot pins 9 in Fig. 12. These film supporting bars are further illustrated in Fig. 15, which is a cross section taken on the line 15—15 in Fig. 9.

Each of the annular rings 30 is provided with a laterally extending bearing 33 which rotates on rollers 34 mounted on plate 35 which is guided for vertical movement on the frame 24. Thus each ring not only can rotate about its axis but it can also be moved vertically. It is necessary to move the rings vertically out of the position shown in Fig. 9 to a position such that the buckets, as they advance, will not strike against the rings or their associated mechanisms. The heating element 19 also is guided for vertical movement in a manner to be described later so that it will move vertically a distance somewhat greater than the amount of movement provided for the rings 30 whereby the wrapping material can be advanced without engaging the heater. Note also in this connection that the dancer roll 21 provides means for keeping the tension in the wrapping material 18 during the reciprocation of these parts. Thus it will be noted in Fig. 9 that with the parts in the position illustrated the dancer roll 21 is at a raised position. As the heating element 19 is lowered, the wrapping material is fed from roll 17 over roller 22 to dancer roll 21 until brake 25 overcomes the momentum imparted to roll 17 due to indexing, and the dancer roll then drops to the position illustrated by dotted lines in that figure.

Also mounted for vertical movement, and without at the present time describing how this vertical movement is accomplished, is the sponge rubber presser member 36 which is recessed at 37 (see Fig. 10). This presser member 36 is held within a hollow metal box-shaped holder 38 extending transversely of the machine which in turn is secured to the channel 39 suitably mounted for vertical movement in a manner to be described later.

The sequence of operation for the mechanism just described is briefly as follows. As the star wheels 10 and 11 are advanced, the bucket at position 2 carrying the article 1 is advanced to position 3 for wrapping and during this operation the presser member 36 is raised as shown in Fig. 10 and the rings 30 and heating element 19 are also raised. After the article 1 arrives at the wrapping position 3 (see Fig. 9) the presser element is moved downwardly against the article and the heated wrapping material 18 is pressed about the article and into engagement with the wrapping material 13. Since the wrapping material has been heated and is "tacky," the pressing operation seals the two layers of wrapping material together where they are brought into contact with each other adjacent the edges of the article to thereby seal the wrapping material snugly about the article on all sides and to hermetically seal the article to prevent the entrance of moisture into the wrapper provided by the two layers of wrapping material. During this operation, the air is evacuated from between the layers of material in a manner to be described later. The material is also stretched snugly about the article.

When the article is similarly advanced to the trimming position 4, the resiliency of the sponge rubber causes the article to be raised somewhat to bring the engaging layers of wrapping material, hereinafter referred to collectively as the web 40, above the surface of the sponge rubber 7 so that the web is free of the sponge rubber at points just immediately adjacent the article. The article is still firmly held in the web of material and it is desired that the article be separated therefrom and for this purpose there is illustrated a plate 41 recessed or hollowed out to receive the article and this plate is carried freely on the end of an oscillating arm 42 by means of the ears 43 on the plate 41 and a pivot member 44 arranged in slots 45 in the end of the arms 42. The arm 42 is reciprocated to move the plate 41 into and out of the solid line position shown in Fig. 9 so that it is out of the way when the material and articles are being advanced but will be brought down into the solid line position shown in Fig. 9 to trim the article from the web when the article arrives at the trimming position.

On the under side of the plate 41 there is provided a wire 46 which has a shape similar to that of the article but preferably just slightly larger than the article. This wire is carried on the plate by means of suitable insulating members 47 in view of the fact that it is desired to heat the wire electrically whereby it will burn through the web of material when it is brought against it. Any suitable electrical means may be used for heating the wire and this is not illustrated as such means are well known and within the scope of anyone skilled in the art to which it pertains. Since the web of material is raised above the surface of the sponge rubber, the hot wire is not brought into contact with the sponge rubber during the severing of the article from the web. The trimming operation leaves a small portion of the web extending from the article but rubber hydrochloride film, when it is heated, has a tendency to shrink, whereby when the article is released from the web the protruding portion of the web still projecting from the article will shrink against the article and practically disappear, thus producing a packaged article which only has a very slight seam around the periphery.

On the next advancing movement of the star wheels, the article is discharged onto the conveyor 5 and is carried away. With certain types of articles, such as the round articles herein illustrated, it may be necessary to provide suitable abutments 48 on the conveyor 5 so that the article will advance with the conveyor to a collecting position. The web of material, which is still unbroken, is trained over a roller 49 and wound up on a takeup roll 50.

The arms 31 on the ring 30 have the outer ends thereof bifurcated with the inner surfaces at an angle of approximately 90°, as is best illustrated in Figs. 9 and 10. These are adapted to engage rollers 51 on the ends of the pins 9. In the position shown in Fig. 9, two of the arms of each ring rest on the rollers connecting adjacent buckets whereby the rings are solidly supported. As the buckets are moved from one position to the other, the roller engaging the lower left hand arm 9 in Fig. 9 remains in engagement with the roller and, due to the fact that the rings are confined to move vertically, the ring is lifted upward and is rotated counter-clockwise as the conveyor moves to the right. This raises the arm 31 shown at the lower right in Fig. 9 until it is at the horizontal position shown in Fig. 10 and continued movement of the conveyor (which in Fig. 10 is shown at its halfway position during this movement) will cause this arm to move to the upper right position shown in Fig. 9. In other words, the ring turns 90° on each advance movement of the conveyor. The rings 30 carried by the rollers 34 and mounted on the frame 35 can move vertically along with the plate 35 due to the fact that the edges of this plate are guided in the guideway 52 provided in the frame 24. Since the rings 30 have large open centers, the channel 39 supporting the presser member 36 can move vertically independently of the rings.

So far, the mechanism which has been described has been described with the reference to the particular actuating means and, while this is not particularly important since various means can be devised for accomplishing the described movements, nevertheless I have shown as one embodiment of this mechanism the following:

The prime mover for all of the motions hereinbefore described is a motor 53 which drives a shaft 54 through the intermediary of a gear reduction mechanism 55 and a chain 56. The shaft 54 is the main driven shaft from which the various mechanisms are operated. Referring to Fig. 2, it is to be noted that the frame 24 is supported by two connected pedestals 57 and 58, one on each side of the mechanism which has been described. These pedestals 57 and 58 are supported on a base 59 and each of these pedestals is hollow and provided with cover plates 60 and 61, respectively. These cover plates can be removed to inspect and repair the mechanisms housed therein and which are presently to be described. Fig. 3 is a view looking from the left in Fig. 2 in the direction of the line 3—3. In Fig. 3 the cover plate has been removed to expose the mechanism in the pedestal 58. Fig. 6 is a similar view looking in the direction of the line 6—6 in Fig. 2 and shows the mechanism housed within the pedestal 57.

Referring to Fig. 3, the shafts 62 and 63 are the shafts which support the first and last star wheels shown in Fig. 9. A Geneva wheel mechanism, well understood in the art, is shown as comprising the wheel 64 on the shaft 62 and the actuating pin 65 carried by an arm 66 on the shaft 54. Thus if the shaft 54 moves in the direction indicated by the arrow, the pin 65 imparts an intermittent movement to the wheel 65 and, consequently, to the shafts 62 and 63, whereby the bucket conveyors are advanced as previously described.

In order to set up the vertical reciprocation of the heating element 19 and the presser 36 carried by the channel 39, the following mechanism is provided: Two rods 67 guided in a bearing 68 (Figs. 6 and 3) are connected together at the bottom by a bar 69 and are connected at their upper ends by a bar 70 extending across the machine from one pair of rods 67 to a similar pair of rods on the opposite side thereof, both of which are moved vertically in unison so as to cause vertical movement of the heater 19 connected to the bar 70 by brackets 71. The channel 39 is provided at its ends with bosses for receiving the rods 67 and set screws 72 or other suitable fastening means are employed to lock the channel in proper vertical position on the pairs of rods on each side of the machine. The position of the heater 19 with respect to the rods and to the channel 39 is accomplished by use of the adjusting and locking nuts 73 on the upper thread ends 74 of the rods 67. Thus the heater 19 and the presser member 36 move vertically in unison and the timing is such that these are moved vertically a sufficient distance to bring the presser member 36 and heater 19 free of the film used for wrapping purposes before the rings 30 are rotated.

In order to move the rods 67 vertically, there is provided the reciprocating rods 74 and 75 on opposite sides of the machine within the housings 58 and 57, respectively. Each of these rods are connected in a similar manner to the vertical rods 67 which they operate and therefore I will use the same reference characters to describe these mechanisms. A shaft 76 carries two bell cranks, one at each end, the bell cranks having the short arms 77 and the long arms 78, the short arms being connected by links 79 to blocks 80 on the rods 74 and 75. The long arm of each of the bell cranks is connected by means of a link 81 to the connecting bar 69. Thus, reciprocation of the rods 74 and 75 rocks the bell cranks and causes vertical movement of the rods 67.

In order to secure the proper timing for this reciprocation of rods 74 and 75, there is provided in the housing 57 a cam 82 mounted on shaft 54. This cam has a grooved track 83 in which a roller 84 on the end of rod 75 is adapted to travel. This cam gives the proper reciprocating motion to the rod 75. The cam track 83 is so designed as to cause upward movement of the rod 67 to move the presser member and heater member out of engagement with the film just prior to the time the Geneva wheel mechanism is actuated to advance the buckets. The reciprocation of the rod 75 causes direct actuation of the link 81 which moves the rods 67 vertically in Fig. 6, but with respect to the other link 81 shown in Fig. 3 and arranged at the opposite side of the machine, the actuation of the link 81 is caused by the rocking of the shaft 76 which carries both bell cranks, the shaft being rocked by the rod 75 as the latter reciprocates. In order to counterbalance at least some of the weight of the heater 19 and the presser member 36 and their associated mechanisms, there is provided a spring 85 connected to a fixed support 86 and to the long arm 78 of the bell crank in Fig. 6 and a similar spring 87 connected to a fixed support 88 and a block 89 carried by the rod 74 (shown in Fig. 3). It will be noted that while these springs are differently arranged, they both accomplish the same purpose, namely, they give a vertical thrust to the links 81 for counterbalancing purposes.

The shaft 54 (Fig. 6) is also provided with a cam for causing rocking movement of the arm 42 carrying the trimming mechanism shown in Fig. 9. The arm 42, which carries the trimming mechanism, oscillates with a shaft 90 (Figs. 6 and 9) rotatable in bearings in pedestals 57 and 58. Within the housing 57 this shaft 90 is provided with an arm 91 connected by an adjustable link 92 to a rocker arm 93 pivoted at 94 and having a roller 95 mounted thereon intermediate its ends travelling on a cam 96 also carried by the shaft 54. The actuation of the rocker arm 93 causes oscillation of the shaft 90 and effects the movement of the trimming mechanism into and out of operative position, as previously described. The rods 74 and 75 project outwardly beyond the housings, as shown in Figs. 3 and 6, and carry the heater 14, whereby the heater 14 is moved out of engagement with the film being fed from the rolls 15 at the same time that the heater 19 is moved out of engagement with the film being fed from the roll 17.

The shaft 63 also carries a brake drum 97, engaged by brake bands 98, which is adjustably connected at 99 to the housing 57 and at the other end is connected at 100 to the end of a rocker arm 101 pivoted at 102 and having a roller 103 at the end thereof engaging a cam 104 on the shaft 54. The cam 104 is so designed that when the roller 103 is riding on the high part of the cam, as shown in Fig. 6, the brake will be applied to hold the shafts 63 and 62 stationary and thus prevent movement of the buckets 6. The timing of the cam is such as to cause this braking action at the time just as the buckets are moving to a stop at the next successive position, after which the brake is released in time to permit movement of the buckets during the period that the heater and pressing element 36 are moved to their inoperative positions.

Figure 1:
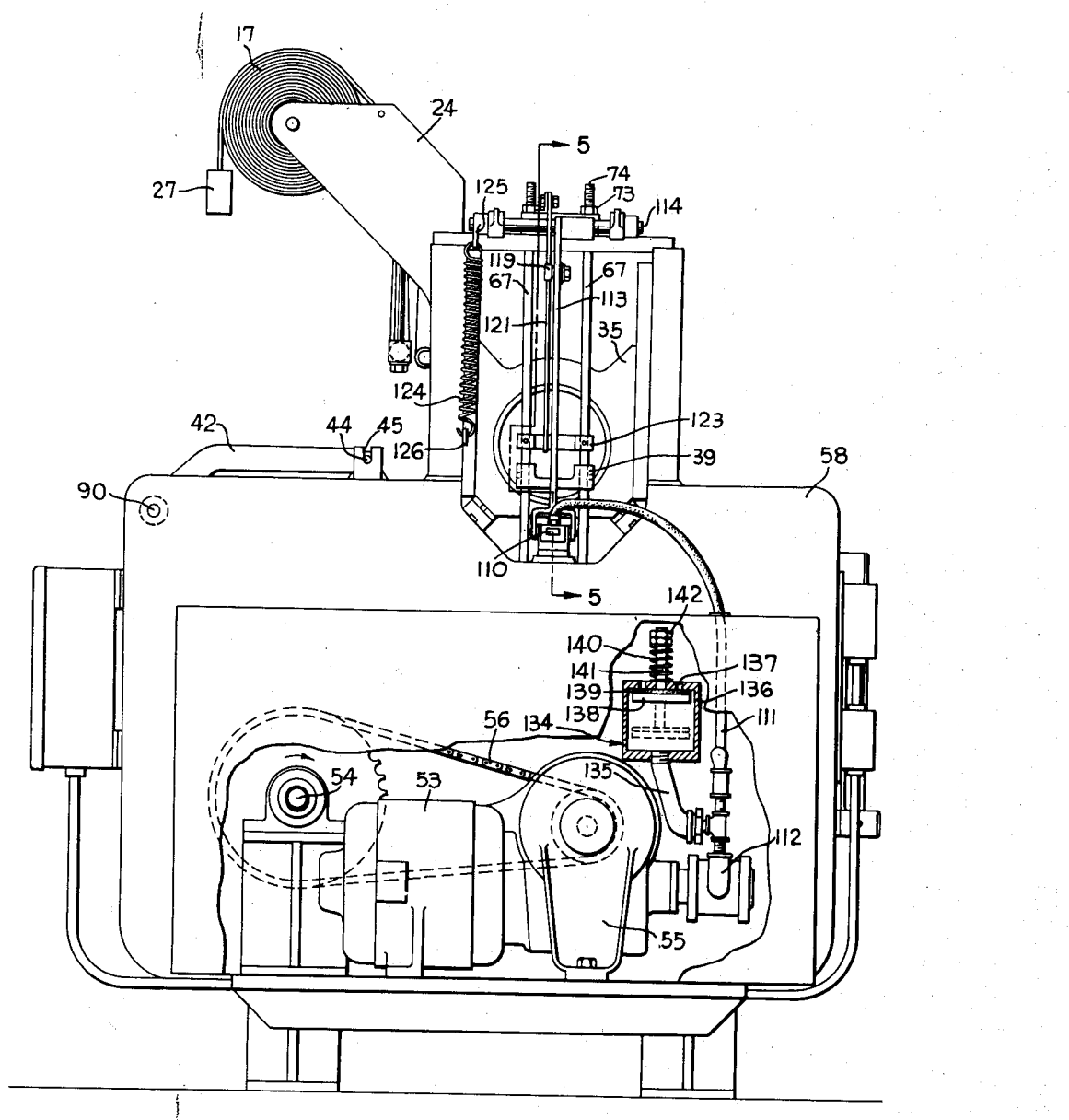
Fig. 1 is a side elevation of a machine embodying the invention with parts broken away for the sake of clearness.

The mechanism for evacuating the air from the package while it is being wrapped is best illustrated in Figs. 1, 5, 12, 13 and 14. The air is evacuated from both ends of the package simultaneously and since both mechanisms are identical in construction, a description of one will suffice to describe both, and therefore I will refer particularly to Fig. 5 which shows the pedestal 57 as supporting a channel-shaped member 105 provided with a central opening 106 and two recesses 107 at each end which receive the springs 108 to yieldingly support a guide member 109 in which a flat, hollow nozzle 110 is mounted for reciprocation. This nozzle is adapted to normally ride between the two opposed layers of film being fed through the machine and to have a movement to the left, as viewed in Fig. 5, sufficient to bring it approximately into engagement with the article being wrapped just prior to the time that the presser member 36 brings the films into sealing engagement. The nozzle is hollow and is connected by means of a hose 111 to a suitable source of vacuum which in the present embodiment is created by a vacuum pump 112 driven by the main shaft of the motor 53 (see Fig. 1). For the sake of simplicity, and since the particular vacuum-producing means is immaterial, there is shown in Fig. 1 a diagrammatic illustration of the hose 111 connected directly to the outlet of the vacuum pump and to the nozzle 110. Any other suitable vacuum means can be employed for this purpose, the principal idea being to have a vacuum means which will withdraw the air from between the layers of wrapping material and from around the object being wrapped while the parts are in the position shown in Fig. 5.

When the presser member has caused a sealing engagement between the layers of film with the exception of those areas on opposite sides of the nozzles and after a sufficient time has elapsed to cause withdrawal of the required air from between the films, it is necessary to move the nozzles clear of the package and the presser member 36 so that the remaining portions of the film may be sealed together. Later the nozzle must again be moved to the left when the next article is being packaged. For the purpose of reciprocating the nozzle 110 there is provided a bell crank lever 113 pivoted at 114 to the frame 24 and at 115 to a link 116 which in turn is pivoted at 117 to a block 118 adjustably mounted on the nozzle 110, whereby the block can be adjustably positioned to hold the nozzle at any desired initial position to thus insure the inner end of the nozzle being at its proper position when the air is being evacuated. Intermediate the ends on the crank is a roller 119 adapted to engage the cam track 120 of a cam 121 secured at its upper end to a bracket 122 which in turn is secured to the bar 70 and by a bracket 123 secured to the rods 67, whereby this cam moves vertically with rods 67 and bar 70 to oscillate the crank 113. Provision may be made for varying the vertical position of the cam to change the position of the cam track 120 if desired. This would permit varying the distance that the nozzle 110 would be moved to the left and to the right as viewed in Fig. 5. As illustrated, however, a different but very simple arrangement is provided for varying the extent of movement of the nozzle. This is accomplished by having the nozzle 110 adjustable longitudinally within the block 118 so as to change its innermost position with respect to the link 116. A set screw 127 may be used for locking the block 118 in adjusted position. A spring 124 connected to an arm 125 on shaft 114 and to an ear 126 on frame 24 holds roller 119 against the cam 121.

The operation of this device is as follows: The buckets are advanced through successive loading, wrapping and trimming positions 2, 3 and 4, respectively, by means of the Geneva wheel mechanism actuated by the motor 53, gear reduction 55 and chain 56 which drives the shaft 54 on which a portion of the Geneva wheel mechanism is mounted. During the advance of the buckets from one position to the other, it is necessary that the presser member and heaters be moved vertically with the film out of engagement with the film to permit advance of the film and advancement of the buckets. This is accomplished by the rods 74 and 75 which directly actuate the heater 14 and, through the mechanism previously described, cause vertical movement of the rods 67 to raise the heater 19 and presser member 36 out of the way. During this movement, the cams 121 move upward, causing a withdrawal of the nozzles 110, thus permitting the presser member 36, during the last part of the period it is in engagement with the film, to seal the opening formed by the nozzles. The rotation of the star wheel 10 at the left in Fig. 9 and the rotation of the ring 30 causes advancement of the films 13 and 18 to bring a fresh, unheated portion of each of these films opposite the heaters 14 and 19, respectively.

After the buckets have been advanced, the presser member 36 moves down to press the layers of film together and the heaters 19 and 14 move into engagement with the film to heat new areas of the film. Just prior to engagement of the two films about the object, the end of nozzle 110 is moved into proximity with the object to be wrapped, whereby the air may be withdrawn from between the layers.

At the trimming position the arm 42, which is actuated by the cam 96 through the linkage 93, 92 and 91 and the shaft 90, is moved into the position shown in full lines in Fig. 9 to cause the heating element 46 to engage the film close to the object, thus severing the wrapped object from the web. On the next advance of the buckets, this object falls onto the conveyor 5 and is moved to a discharge position, the web material being wrapped on the roll 50. During advance of the wrapping material, the arm 42 is in raised position.

It is not necessary that the sponge rubber pad 7 and the presser member 36 be hollowed out, especially where the objects to be wrapped are relatively thin in a vertical direction as the sponge rubber is sufficiently yieldable to permit satisfactory wrapping under certain conditions. However, the recesses do insure a more uniform pressure. It will be noted that by the mechanism which has been herein described the two layers of film at the wrapping position are brought together while the film is stretched in each case in a single plane so that as the presser member moves the opposed layers of film together, they are substantially simultaneously sealed around the periphery of the object at all points. Thus a complete enclosure, except where the nozzles are arranged between the layers of film, is formed in a very short period of time, thus permitting the nozzles to go into operation very quickly to thereby provide a speedy evacuation of the package.

As another modification of the invention, it is contemplated that the heater 19 and the heater 14, for that matter, could be constructed so that they would only heat the area to be sealed together instead of heating the entire area of the films which form the package. One manner of doing this is shown in Figs. 16 and 17, along with other details showing a modification of the machine shown in Figs. 1 to 15, inclusive.

In Figs. 16 and 17, the same numbers refer to the same parts shown in Figs. 1 to 15, inclusive, and it will be understood that the advancing of the material and the operation of the conveying mechanism for the articles is the same as in the previous figures.

Referring particularly to Fig. 17, it is to be noted that the star wheels 10 and 11 carry the bucket conveyors 6 and advance them through their successive positions. However, in this form of the invention the sponge rubber material is removed from the buckets of the conveyor although this is not absolutely necessary as these can be merely covered over by the supplemental means shown in Fig. 17. This supplemental means comprises a plate 128 having a rectangular recess 129 and a plate 130 in the plane of the plate 128 arranged in the opening 129 but spaced therefrom to form a continuous recess for a purpose to be described later. The plates 128 and 130 are connected by straps 131 of inverted U-shape which connect the plates. It is to be understood that in place of the construction herein illustrated a single plate may be formed by a die with a rectangular channel in place of the recess formed between the plates 128 and 130. The presser element 132 in this form of the invention is preferably hollowed out so that it will only contact the wrapping material outside the area of the article being wrapped as will be peresently described. It is reciprocated in the same manner as in the other figures and the trimming mechanism is identical with that shown in the other forms of the invention.

The article to be wrapped is deposited either manually or by suitable mechanical means on the portion of the wrapping material which lies over the plate 130, this article being designated as 133 and represents a rather thin, flat article or group of articles, such as a group of slices of bacon. As the conveyor is advanced, the article is pushed beneath the presser element 132 which descends against the overlying layers of wrapping material 13 and 18 to seal them together at a point outside the edges of the article being wrapped and somewhat spaced therefrom. It is understood, however, that it may be found desirable to have the wrapping material joined closer to the article than illustrated in Fig. 17. The article is then advanced to the next station where it is cut off by the hot wire 46 and, even though the material at this point may not be joined together by the pressing action at the wrapping position, nevertheless as the hot wire penetrates the layers it will seal the layers together and trim the article from the remaining web of wrapping material in the same manner as described in connection with the other figures.

It will be understood, of course, that in connection with the wrapping of the articles by mechanisms such as shown in Figs. 16 and 17, the air evacuating means described in the other figures will be used so as to evacuate the air from the package to prevent spoilage of the material therein.

The vacuum line 111 from the pump 112 is provided with a relief valve mechanism generally designated as 134 connected by means of an elbow 135 to the vacuum line 111. This relief valve, which is here shown more or less diagrammatically, comprises an outer casing 136, the top of which is provided with the openings 137 adapted normally to be closed by a poppet valve 138 having a rubber sealing surface 139 or its equivalent which, when the valve is in the full line position shown in Fig. 1, closes the openings 137 and a spring 140, surrounding the stem 141 and which abuts against the nut 142 on the stem and against the casing 136, normally holds the valve in the closed position. When the air has been exhausted from the package, the amount of vacuum in the vacuum line increases and if it were not for the relief valve, portions of the wrapping material might be drawn into the end of the nozzle or the heated material forming the package might be ruptured. However, when the vacuum pressure does build up to a dangerous point, the valve 138 opens and permits air to enter the vacuum line through the openings 137. The time at which the valve will open can be adjusted by varying the compression of the spring 140. This is done by adjusting the nut 142 on the stem. With such an arrangement it is therefore possible to rapidly withdraw the air from the package and, as soon as the air has been exhausted and the vacuum builds up to a dangerous point, the relief valve will open and reduce the amount of vacuum in the line. It will also be noted that the nozzle is projected into a position close to the article so that the opposed layers of wrapping material will not be drawn together adjacent the nozzle to seal off the vacuum line before the air is entirely exhausted.

It is also to be understood that the shape of the buckets, and the particular means for advancing them, is relatively unimportant to accomplish most of the objects of this invention but the buckets are shaped as shown so as to provide proper clearance as the buckets move around the star wheels 10 at the ends and also to provide a construction in which these sponge rubber cushions may be readily changed to provide other cushions having differently shaped recesses for other objects.

While certain representative embodiments and details have been shown for the purpose of illustrating the invention, it will be apparent to those skilled in this art that various changes and modifications may be made therein without departing from the spirit or scope of the invention.

Having thus fully described the invention what I claim and desire to secure by Letters Patent of the United States is:

1. The method of wrapping articles which comprises advancing a readily compressible article support along a defined path to a loading position, positioning a layer of wrapping material above said support at said loading position, placing an article on said layer at said position and advancing the article and wrapping material to a wrapping position at which a similar layer of material is positioned over the article, applying a pressing force to the layers of said material to force the layers of material against the article and into engagement with each other to unite said layers around the periphery of the article while at the same time compressing the material of said support, relieving the pressing force, whereafter, due to the fact that the article and support are relieved of the pressing force, the article is forced upwardly so that united portions of the layers are free of said support, and then advancing cutting means against the united portions of said layers while free of said support to separate the wrapped article from the web formed by the joined layers.

2. The method of wrapping which comprises advancing two webs of heat-sealable material along predetermined paths into eventual superimposed relation at a wrapping position, interposing an article between said webs prior to said webs arriving at said article wrapping position, heating only a defined area of said webs wholly inwardly of the edges of said webs at a position prior to the position at which an article is placed between said webs or in engagement with either one thereof, resiliently supporting the article during the wrapping operation, compressing the webs about the article into heat sealed relation about the periphery thereof, advancing the webs and article to a cut-off position and cutting the joined webs of material adjacent the article while holding the web away from said resilient support.

3. The method of wrapping articles which comprises the steps of placing a heated web of heat sealable material on a compressible support, placing an article to be wrapped on said heat sealable material, superimposing another web of similar material over said article, pressing the two webs of material about the article and simultaneously compressing said support, relieving the wrapping pressure, whereby the joined webs adjacent the article are elevated to position the webs free of the support, and then advancing a cutting element against the web adjacent the article while the wrapped article is so positioned on the support to sever the article from the joined webs.

4. In a wrapping machine, the combination with a conveyor having rigid, hollow pockets, resilient material of a highly compressible nature arranged in said pockets, means for advancing a web of wrapping material in substantial unison with said conveyor and closely adjacent thereto, means for advancing a second web of wrapping material over said first web and in superimposed relation to an article to be wrapped when the latter is placed therebetween and a resilient presser member mounted at the wrapping position for movement toward and from the conveyor, means for moving said presser member toward the article and webs for pressing the webs of material into joined relation around the edge of the article while at the same time compressing the resilient material, means for moving said presser member away from said support after the article is wrapped, whereby the joined areas of the webs are raised above said resilient material, and means for thereafter cutting said webs where joined while the webs are so positioned.

5. A device as set forth in claim 4 in which there is a hollow member mounted to be positioned between the webs of material at the wrapping position before the webs are moved together, means connecting said hollow tube to a source of vacuum and withdrawing said tube from between said webs during the pressing of the webs of material about the article and into sealing relation with each other.

6. A device as set forth in claim 5 in which the hollow member is provided with means to adjustably set the extent of movement thereof toward the article.

7. A device as set forth in claim 6 in which there is a hollow tube mounted for movement into a position between the webs of material at the wrapping position to a point such that the inserted end of the hollow member lies closely adjacent the article being wrapped during the wrapping operation, a vacuum producing means, means connecting said hollow tube to said vacuum producing means and means for withdrawing said tube from between said webs during the pressing of the webs of material about the article and into sealing relation with each other.

8. A wrapping machine comprising a series of work supports, pivots connecting the work supports to form an endless chain, means for advancing the work supports through successive positions, and means positioned substantially parallel to the pivots for engaging transversely extending areas of said wrapping material and positively advancing said wrapping material advanced thereover, each of said supports comprising a deep hollow, substantially rigid receptacle having a readily compressible article and film supporting member arranged therein.

9. A wrapping machine comprising a series of work supports, pivots connecting the work supports to form an endless chain, means for advancing the work supports through successive positions including a heating position at which the wrapping material is heated and a wrapping position at which the article is wrapped, heating means positioned at said heating position, at least one pressure member at said wrapping position and means positioned substantially parallel to the pivots for engaging and positively advancing wrapping material positioned thereover, each of said supports comprising a deep hollow, substantially rigid receptacle having a readily compressible article and film supporting member arranged therein.

10. A wrapping machine comprising a series of work supports, pivots connected to the work supports to form an endless chain, means for advancing the work supports through successive positions including a heating position at which the wrapping material is heated and a wrapping position at which the article is wrapped, heating means positioned at said heating position for heating less than the entire width of the wrapping material, at least one pressure member at said wrapping position, and means positioned substantially parallel to the pivots for engaging and positively advancing wrapping material positioned thereover, each of said supports comprising a deep hollow, substantially rigid receptacle having a readily compressible article and film supporting member arranged therein.

11. In a wrapping machine in which means are provided for enclosing an article between layers of wrapping material and means for sealing said wrapping material about said article, the combination with said enclosing and sealing means of means for evacuating air from between said layers of wrapping material prior to final sealing thereof, comprising a nozzle insertable between opposed layers of said wrapping material, yieldable means continuously pressing the wrapping material about said nozzle, vacuum producing means, a conduit connecting said nozzle and vacuum producing means for evacuating air from between said layers through said nozzle, and means operable when substantially all of the air is exhausted from between said layers for withdrawing said vacuum producing means, said yieldable means being operable upon withdrawal of said nozzle to move the opposed portions of said layers engaging said nozzle into sealing engagement with each other to prevent the entrance of air into the enclosed space between the layers.

12. The method of wrapping an article in a flexible wrapper which comprises positioning a wrapper about the article, projecting a hollow conduit through an opening in the wrapper into the space within the wrapper with the inner end in the proximity of the article, yieldingly pressing the wrapper about the article including the zone in the vicinity of the conduit to assist in moving the air in the wrapper through said conduit, then withdrawing the conduit while maintaining the yielding pressure on the wrapper to close the opening to prevent entrance of air to said wrapper and simultaneously sealing the wrapper about the article while under the yielding pressure.

13. The method set forth in claim 12 which includes the steps of reducing the air pressure in said conduit to increase the speed of removal of the air from the wrapper.

References Cited in the file of this patent

UNITED STATES PATENTS

| | | |
|---|---|---|
| 645,016 | Rose | Mar. 6, 1900 |
| 1,402,293 | Heist | Jan. 3, 1922 |
| 1,564,453 | Shampay | Dec. 8, 1925 |
| 1,970,193 | Riebel, Jr. | Aug. 14, 1934 |
| 2,074,285 | Studt et al. | Mar. 16, 1937 |
| 2,145,941 | Maxfield | Feb. 7, 1939 |
| 2,210,509 | Strauch | Aug. 6, 1940 |
| 2,223,017 | Abrams et al. | Nov. 26, 1940 |
| 2,232,783 | Hausheer | Feb. 25, 1941 |
| 2,438,089 | Carson | Mar. 16, 1948 |
| 2,484,780 | Clunan et al. | Oct. 11, 1949 |
| 2,486,758 | Pfeiffer | Nov. 1, 1949 |
| 2,486,762 | Pfeiffer | Nov. 1, 1949 |
| 2,490,781 | Cloud | Dec. 13, 1949 |
| 2,549,123 | Osterhof | Apr. 17, 1951 |